United States Patent [19]
Freeze

[11] 3,789,293
[45] Jan. 29, 1974

[54] ELECTRICAL CURRENT MONITOR WHICH SEPARATELY INDICATES INDIVIDUAL AND SUSTAINED CURRENT PULSES

[75] Inventor: John A. Freeze, South Boston, Va.
[73] Assignee: Westinghouse Electric Corporation, Pittsburgh, Pa.
[22] Filed: June 15, 1972
[21] Appl. No.: 263,053

[52] U.S. Cl.................... 324/51, 324/55, 324/102, 340/253 R
[51] Int. Cl... G01r 31/02, G01r 31/06, G01r 19/16
[58] Field of Search 324/34 TA, 51, 54, 103, 103 P, 324/127, 133, 55; 317/27, 38; 340/253 R, 253 P, 255, 253 A

[56] References Cited
UNITED STATES PATENTS

| | | | |
|---|---|---|---|
| 2,114,865 | 4/1938 | Traver | 324/103 P |
| 2,992,365 | 7/1961 | Brill | 324/103 P X |
| 3,029,423 | 4/1962 | Koranye | 340/253 P |
| 3,217,246 | 11/1965 | Kallet et al. | 324/54 |
| 3,570,004 | 3/1971 | De Jong | 324/103 P |
| 3,573,614 | 4/1971 | Wittbrodt | 324/133 X |
| 3,600,293 | 8/1971 | Hyouk et al. | 324/133 X |
| 3,670,239 | 6/1972 | Shiraiwa et al. | 324/43 R X |

FOREIGN PATENTS OR APPLICATIONS

| | | | |
|---|---|---|---|
| 1,066,472 | 4/1967 | Great Britain | 324/34 TA |

Primary Examiner—Gerard R. Strecker
Attorney, Agent, or Firm—J. R. Hanway

[57] ABSTRACT

Transformer fault current monitor which provides recorded indications of the number of times any fault currents have occurred and also of the number of times fault currents which have a duration of more than a predetermined length of time have occurred. In one embodiment, a magnetic reed switch is positioned in the magnetic field produced by the monitored current. When the reed switch is closed by a high magnetic field, a voltage is applied to a peak detector circuit. The voltage is peak detected and applied to first and second counting means. The first counting means is activated when the monitored current exceeds a predetermined level. The second counting means is activated when the monitored current exceeds a predetermined level for a predetermined length of time. In another embodiment, magnetic diodes are positioned in the magnetic field produced by the monitored current. The magentic diodes are connected to a differential amplifier which provides an output voltage when a sufficient magnetic field surrounds the diodes. The differential amplifier is connected, through suitable circuitry, to first and second counting means.

13 Claims, 6 Drawing Figures

ELECTRICAL CURRENT MONITOR WHICH SEPARATELY INDICATES INDIVIDUAL AND SUSTAINED CURRENT PULSES

BACKGROUND OF THE INVENTION

1. Field of the Invention:

This invention relates, in general, to electrical measuring apparatus and, more specifically, to electrical current monitors.

2. Description of the Prior Art:

With the increasing use of electrical power, near capacity loads are being applied to electrical power transmission and distribution systems. In heavily loaded power systems, the system components are highly susceptible to conducting electrical currents having amplitudes which exceed normal or rated currents during a fault condition. That is, the fault current greatly exceeds the rated current of the system components.

Many types of electrical system components, such as power and distribution transformers, are constructed to withstand a certain amount of excessive fault of shor circuit current. When the amount of fault current is exceeded, or when the number of such faults is abnormally large, such transormers may be permanently damaged and must be repaired or replaced. The amount of excessive fault current a transformer is subjected to and the frequency of occurrence of the fault is dependent on the class, type, rating, service, etc. of the transformer. In order to determine the fault current capability a transformer must withstand, it is necessary to determine the amplitude and frequency of fault currents the transformer will be subjected to.

Unfortunately, data concerning the amplitude and frequency of transformer fault currents is not plentiful. Due to the large currents involved, the usually long length of time between fault currents, the remoteness of the transformer, and other factors, normal data collecting apparatus cannot be used. It is desirable, and it is an object of this invention, to provide an electrical current monitor which will accurately and economically indicate the number of times the monitored current reaches the level of a fault or short circuit current.

Excessive currents due to faults are more damaging when sustained for a relatively long period of time. For example, a fault current occurring for only one cycle is not as destructive as a fault current occurring for 10 cycles. Thus, a fault current monitor only indicates the number of times the monitored current reaches or exceeds the level of a fault current does not entirely represent the destructive conditions to which the apparatus has been subjected. Therefore, it is desirable, and it is another object of this invention, to provide an electrical current monitor which indicates the number of times the monitored current reaches the level of a fault current for a sustained period of time.

By using the current monitor disclosed herein, data can be obtained which will be useful in designing electrical apparatus to withstand short circuit currents.

The monitor is also useful for providing information about excessive loads a transformer has been subjected to. This information is valuable when determining the remaining useful life of the apparatus and when making adjustments for damaged transformers.

SUMMARY OF THE INVENTION

There is disclosed herein new and useful current monitoring apparatus suitable for use in detecting and recording transformer fault currents. In one embodiment, a magnetic reed switch is positioned in the magnetic field of the transformer current. When the magnetic field has sufficient magnitude, the magnetic reed switch closes and voltage is applied to a peak detector. The output of the peak detector is applied to first and second counting means. The first counting means provides a recorded indication of the number of times the monitored transformer current exceeds a predetermined level. The second counting means provides a recorded indication of the number of times the monitored transformer current exceeds a predetermined level for a predetermined length of time. The length of time required by the second counting means to record a fault is controlled by an RC time constant. In another embodiment, diodes which are responsive to a magnetic field are positioned in the magnetic field of the transformer current. A change in the magnetic field produces a voltage change across the magnetic diodes which is applied, through appropriate circuitry, to first and second counting means.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
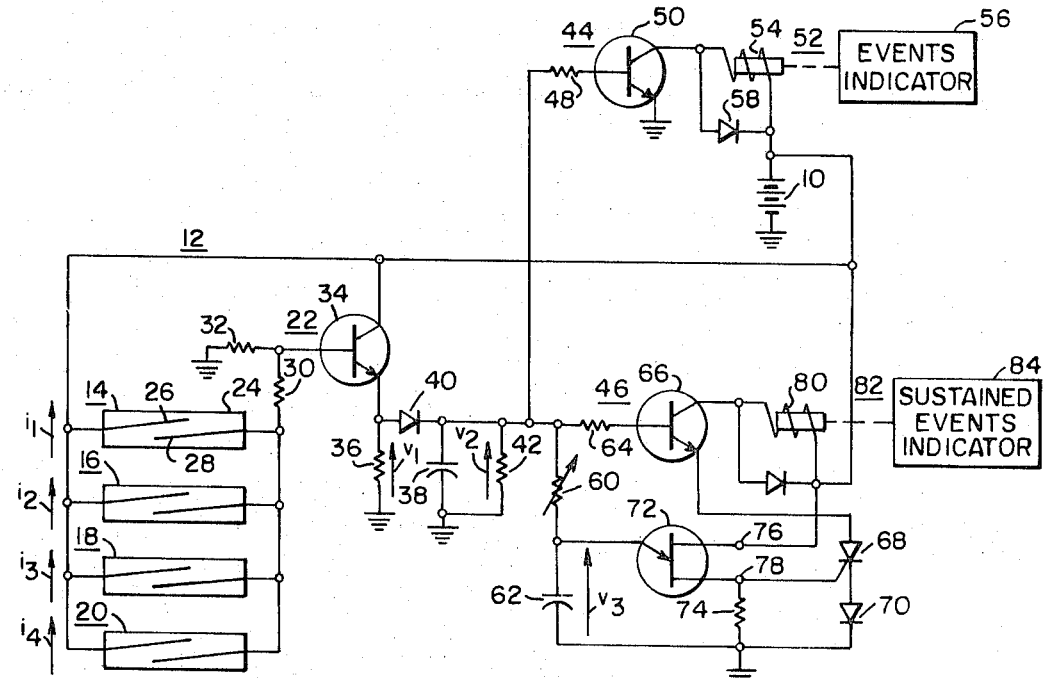
FIG. 1 is a schematic diagram of a current monitor constructed according to one embodiment of this invention.

Throughout the following description, similar reference characters refer to similar elements in all figures of the drawings.

Referring now to the drawings, and FIG. 1 in particular, there is shown a schematic diagram of a current monitor constructed according to one embodiment of this invention. The current monitor includes a voltage source, such as the battery 10, and a switching means 12 which is responsive to the magnetic field produced by the monitored current. The switching means 12 includes the mangetic reed switches 14, 16, 18 and 20 and the emitter follower stage 22. Four magnetic reed switches are shown since the embodiment illustrated is suitable for use with three-phase current systens. Three of the magnetic reed switches are positioned to monitor current at individual phase terminals or conductors and the fourth magnetic reed switch is positioned to monitor the neutral phase current. It is within the contemplation of this invention that more or less than four magnetic reed switches may be used simultaneously.

Each of the magnetic reed switches 14, 16, 18 and 20 includes a non-magnetic casing and two contacts, such as the casing 24 and the contacts 26 and 28 of the magnetic reed switch 14. The magnetic reed switches 14, 16, 18 and 20 are positioned in the magnetic field of the currents being monitored. The vectors $i_1$, $i_2$, $i_3$ and $i_4$ represent the four currents being monitored by this embodiment of the invention. The magnetic field produced by current $i_1$ will close the contacts 26 and 28 of the magnetic reed switch 14 when the current $i_1$ exceeds a predetermined magnitude. A similar reaction occurs with the other magnetic reed switches and their respective currents.

For descriptive purposes, the current $i_1$ will be referred to as the rated current and the current $10i_1$ will be referred to as the fault current. In accordance with this nomenclature, the current monitor indicates a current which is ten times the rated current. Other values may be used without departing from the spirit of the invention.

When a magnetic reed switch closes, a voltage is developed across the resistors 30 and 32 which turns on the transistor 34. This provides a voltage $v_1$ across the resistor 36, which is substantially equal to the voltage of the battery 10, and the capacitor 38 is charged through the peaking diode 40. The capacitor 38, the diode 40, and the resistor 42 form a peak detector which provides a voltage $v_2$ which initially has a magnitude that is equal to the peak of the voltage across the resistor 36 minus the voltage drop across the diode 40. The resistor 42 discharges the capacitor 38 in sufficient time to prevent false indications of the monitor. A sufficient time is equal to approximately two cycles of the monitored current. Generally, this time must be long enough for the current monitor to respond to instantaneous events but short enough to prevent the monitor to inaccurately respond to an instantaneous event as a substained event. For example, if a sustained event is to be indicated for each fault current having a duration which is greater than 10 cycles, the voltage $v_2$ produced by an instantaneous event must be reduced within 10 cycles to prevent an inaccurate indication.

The voltage $v_2$ is applied to the first counting means 44 and to the second counting means 46. The duration of the voltage $v_2$ determines which counting means will be activated. Voltage $v_2$ is applied to a switching means which includes the resistor 48 and the transistor 50. If voltage $v_2$ has sufficient magnitude, transistor 50 is turned on and energizes the electromechanical indicating device 52. The battery 10 provides power for operation of the coil 54 of the indicating device 52 and the diode 58 prevents current transients in the coil 54. The events indicator 56 indicates the number of times the coil 54 has been energized. The indicating device 52 may be a stepping relay, counter or other suitable component. The indicator 56 may be located at a position which is remote from the current being monitored.

The indication provided by the indicator 56 provides information about the number of times the monitored current exceeded a predetermined value, such as 10 times the rated current. A short delay in indicating an abnormally high current results from the response time required for the indicating device 52 to function. Generally, the response time will be in the range of one or two cycles. The time constant of the resistor 42 and the capacitor 38 combination also effectively govern the overall response time. If the response time is too fast, it is possible that an inaccurate indication will be displayed. For example, a fault current occuring for four cycles could be indicated as four separate faults if the monitor responds to each cycle separately. It is desirable that such faults be indicated as one separate fault.

The second counting means 46 provides information about the number of events, such as fault currents, which have a duration of a predetermined length of time, such as ten cycles. The voltage $v_2$ is applied across the variable resistor 60 and the capacitor 62. Voltage $v_2$ is also applied, through the input resistor 64, to a switching means which includes the transistor 66, the silicon controlled rectifier 68 and the diode 70. The voltage $v_3$ develops across the capacitor 62. The rate with which the voltage $v_3$ develops is governed by the values of the resistor 60 and the capacitor 62 and may be adjusted by changing the resistance of the resistor 60. To correspond with other parts of this description of the preferred embodiments, it will be assumed that resistor 60 is adjusted to provide a voltage $v_3$ after ten cycles of fault current which is sufficient to activate the counting means 46.

When the voltage $v_3$, which is applied to the unijunction transistor 72 through the resistor 74, reaches its activating voltage, the transistor 72 is turned on and the terminals 76 and 78 have a low voltage drop therebetween. This fires the silicon controlled rectifier 68 which completes the circuit to the transistor 66. Transistor 66 is then turned on and the coil 80 of the indicating device 82 is energized to operate the indicator 84. The indicating device 82 may be similar to the indicating device 52 described herein. Thus, indicator 84 displays the number of times the fault current exceeds ten cycles in duration. A longer fault duration would not be displayed as an additional fault.

Figure 2:
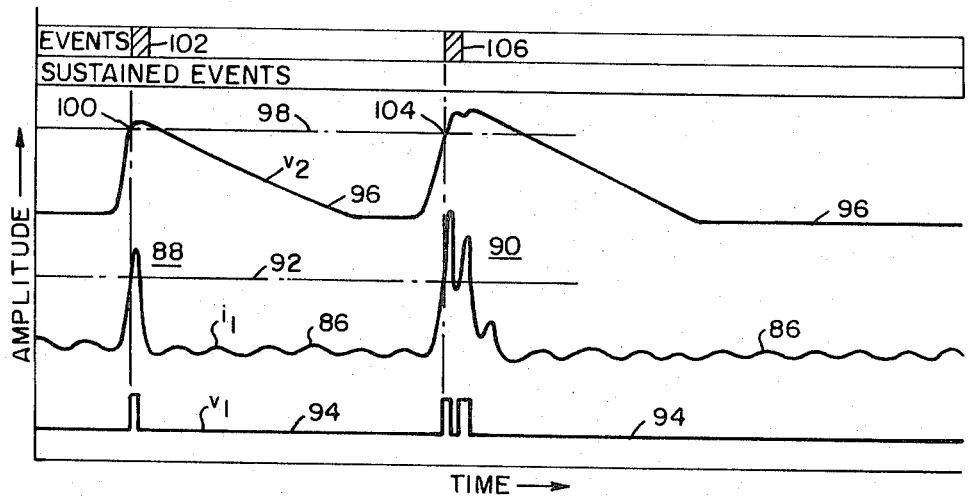
FIGS. 2 and 3 are graphs illustrating voltage and current waveforms which may exist in the current monitor shown in FIG. 1.
Figure 3:
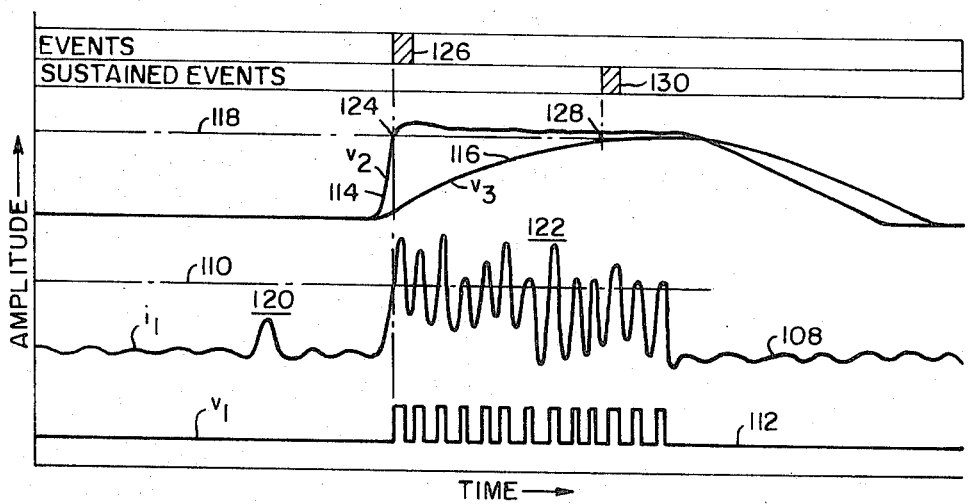

Graphical representations of various monitor voltages and their relation to time are shown in FIGS. 2 and 3. In FIG. 2, the monitored current $i_1$ is illustrated by the curve 86. During the time for which the curve 86 is plotted, the monitored current is increased abnormally by two different fault conditions 88 and 90. The line 92 indicates the level of current $i_1$ above which a fault event is to be recorded.

Curve 94 represents the voltage $v_1$ which occurs in the current monitor when the current $i_1$ has the waveform as shown by the curve 86. Curve 96 represents the voltage $v_2$ which occurs in the current monitor when the current $i_1$ has the waveform as shown by curve 86. The line 98 indicates the level above which a fault event is recorded. When the fault condition 88 causes the voltage $v_2$ to reach the point 100, a fault event is recorded as indicated by the block 102. When the fault condition 90 causes the voltage $v_2$ to reach the point 104, another event is recorded, as indicated by the block 106. Thus, for the time plotted, two faults and no sustained faults have been recorded.

In FIG. 3, the curve 108 represents the current $i_1$, the line 110 represents the fault current level, the curve 112 represents the voltage $v_1$, the curve 114 represents the voltage $v_2$, the curve 116 represents the voltage $v_3$, and the line 118 represents the events recording level. The fault condition 120 is below the fault current indicating level 110 and does not produce a recorded event. The fault condition 122 produces a current which goes above the indicating level 110 for over 10 cycles. The magnetic reed switch is closed and produces the curve 112 for $v_1$. The corresponding voltage $v_2$ reaches the point 124 and records an event as indicated by the block 126. Due to the duration of the fault condition 122, the voltage $v_3$ reaches the point 128 after 10 cycles and records a sustained event as indicated by the block 130. Thus, for the time plotted, one fault and one sustained fault have been recorded.

Figure 4:
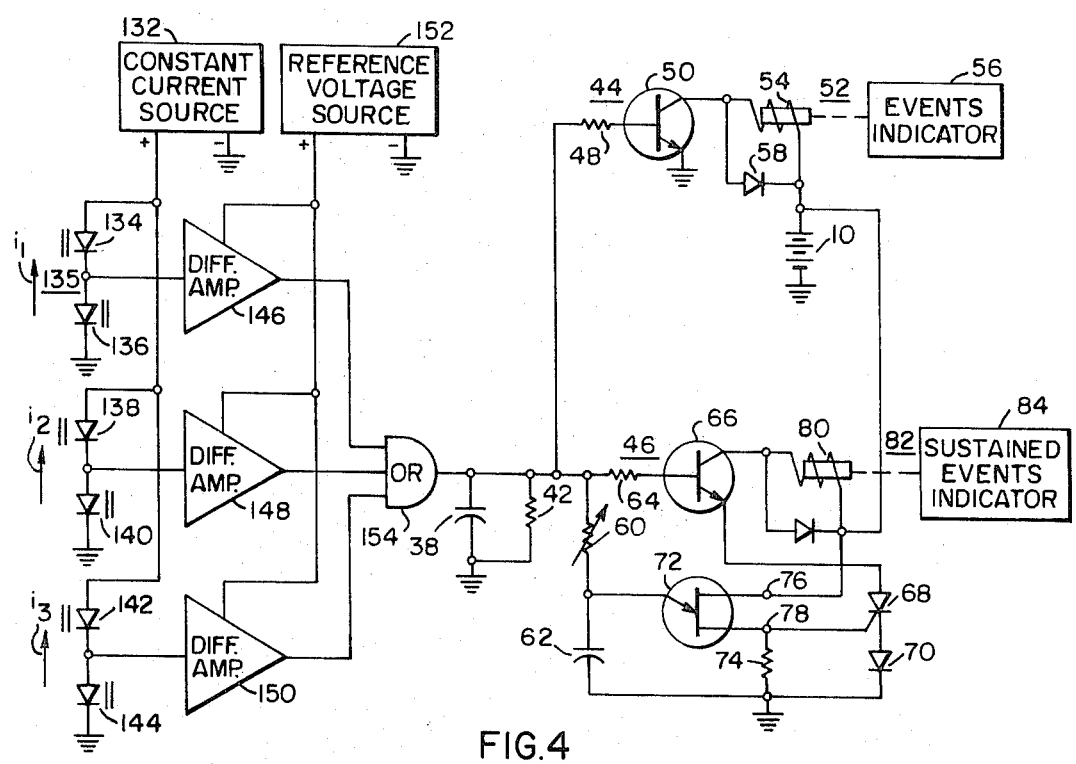
FIG. 4 is a schematic diagram of a current monitor constructed according to another embodiment of this invention.

FIG. 4 illustrates another embodiment of the invention. A constant current source 132 provides a constant current through the magnetic diodes 134, 136, 138, 140, 142 and 144. The magnetic diodes 134, 138 and 142 are construction and aligned in the magnetic field of the currents $i_1$, $i_2$ and $i_3$, respectively, to provide a decrease in their forward conduction resistance when the magnetic field is increased. The magnetic diodes 136, 140 and 144 are constructed and aligned in the magnetic field of the currents $i_1$, $i_2$ and $i_3$, respectively, to provide an increase in their forward conduction resistance when the magnetic field is increased. Therefore, as current $i_1$ is increased, the voltage across the magnetic diode 136 increases. A similar voltage change occurs across the magnetic diodes 140 and 144 when the currents $i_2$ and $i_3$ are increased.

The voltages across the diodes 136, 140 and 144 are applied to the differential amplifiers 146, 148 and 150. With the reference voltage source 152 adjusted to provide a voltage substantially equal to the diode voltage produced when the monitored current is zero, the differential amplifiers 146, 148 and 150 provide outputs when the currents $i_1$, $i_2$ and $i_3$, respectively, increase from zero, whether positively or negatively. The differential amplifier outputs are connected to an OR logic stage 154 which provides an output proportional to the output of the differential amplifier having the largest output.

The resistor 42 and the capacitor 38 form a peak detector which functions similarly to the peak detector described herein concerning FIG. 1. The counting means 44 and 46 are constructed and function similarly to the counting means 44 and 46 shown in FIG. 1 and described in connection therewith. Thus, when the monitored current, such as the current $i_1$, exceeds a predetermined magnitude, such as ten times $i_1$, the indicator 56 will record a fault current event. If the current $10i_1$ has a duration of over 10 cycles, the indicator 84 will record a sustained fault current event.

Figure 5:
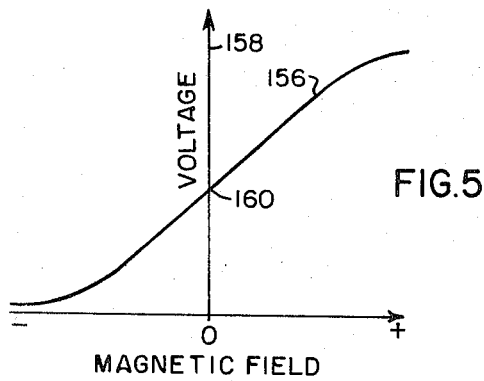
FIG. 5 is a characteristic curve for a magnetic diode pair.

FIG. 5 is a characteristic curve of a magnetic diode pair, such as the magnetic diode pair 135 which includes diodes 134 and 136 as shown in FIG. 4. The curve 156 intersects the voltage axis 158 at point 160 which establishes the quiescent voltage from the magnetic diode pair. As the flux increases with a negative polarity, the voltage provided at the common connection between the paired magnetic diodes decreases. As the flux increases with a positive polarity, the voltage increases. Thus, the differential amplifiers to which the magnetic diode pairs are connected provide outputs when the flux is either positively or negatively polarized. Therefore, fault conditions occurring during either the positive or negative half of the current cycle will be accurately monitored.

Figure 6:
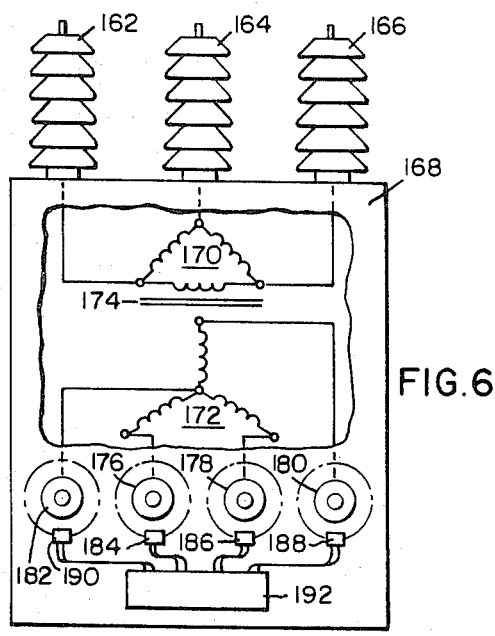
FIG. 6 is a view illustrating the physical arrangement of the current monitor components when positioned to monitor transformer currents.

FIG. 6 illustrates a physical arrangement of the current monitor for monitoring phase currents from a power transformer. The primary bushings 162, 164 and 166 are mounted on the transformer casing 168 and are electrically connected to a delta-connected primary winding 170. A wye-connected secondary winding 172 is coupled to the winding 170 by the laminated magnetic core 174 and is electrically connected to the phase bushings 176, 178 and 180 and to the neutral bushing 182. The current monitor may also be used with a delta-connected secondary winding which does not require a neutral bushing connection.

The sensing devices 184, 186, 188 and 190 are positioned in the magnetic field produced by the current flowing through the bushings 176, 178, 180 and 182, respectively. The sensing devices may be magnetic reed switches as taught by one embodiment of this invention or they may be magnetic diode pairs as taught by another embodiment of this invention. The sensing devices 184, 186, 188 and 190 are connected to other current monitor circuitry which is enclosed in the housing 192.

Since numerous changes may be made in the above-described apparatus and different embodiments of the invention may be made without departing from the spirit thereof, it is intended that all of the matter contained in the foregoing description, or shown in the accompanying drawings, shall be interpreted as illustrative rather than limiting.

I claim as my invention:

1. A current monitor comprising first switching means responsive to the magnetic field of a monitored current, said first switching means providing a first voltage when the monitor current exceeds a predetermined magnitude, peak detecting means connected to said first switching means, said peak detecting means providing a second voltage which is proportional to the peak of the first voltage, first counting means connected to said peak detecting means, said first counting means providing an indication of the number of times the second voltage exceeds a predetermined magnitude, and second counting means connected to said peak detecting means, said second counting means providing an indication of the number of times the second voltage exceeds the predetermined magnitude for a predetermined length of time.

2. The current monitor of claim 1 wherein the first switching means comprises a magnetic reed switch which is positioned in the magnetic field of the monitored current.

3. The current monitor of claim 1 wherein the peak detecting means comprises energy storing means, said energy storing means maintaining a voltage thereon having a magnitude which is substantially equal to the first voltage.

4. The current monitor of claim 1 wherein the first counting means comprises an electromechanical indicating means which provides an additional indication each time the electromechanical indicating means is energized, said electromechanical indicating means being energized by second switching means, the second voltage being applied to said second switching means, and said second switching means conducting when the second voltage exceeds the predetermined magnitude.

5. The current monitor of claim 1 wherein the second counting means comprises an electromechanical indicating means which provides an additional indication each time the electromechanical indicating means is energized, said electromechanical indicating means being energized by third switching means, the second voltage being applied to said third switching means, and said third switching means conducting when the second voltage exceeds the predetermined magnitude for the predetermined length of time.

6. The current monitor of claim 5 wherein the third switching means comprises energy storing means which is electrically connected to the second voltage through an impedance means, said energy storing means developing a third voltage thereon when the second voltage exceeds the predetermined magnitude for the predetermined length of time, said third voltage being applied to a solid state circuit element, said circuit element conducting when the third voltage is applied thereto.

7. A current monitor comprising a magnetic reed switch positioned in a magnetic field of the monitored current, a voltage source connected to said magnetic reed switch, energy storing means, isolation means connected between said magnetic reed switch and said energy storing means, first and second counting means, said first counting means being connected to said energy storing means and providing an indication of the number of times the monitored current exceeds a predetermined magnitude, a serial combination of a resistor and a capacitor connected to said energy storing means, said second counting means being connected to said serial combination and providing an indication of the number of times the monitored current exceeds the predetermined magnitude for a predetermined length of time.

8. A current monitor comprising magnetic diodes which are responsive to the magnetic field of a monitored current, a differential amplifier connected to said magnetic diodes and providing a first output voltage, peak detecting means which provides a second output voltage which is proportional to the peak of the first output voltage, first counting means connected to said peak detecting means, said first counting means providing an indication of the number of times the second output voltage exceeds a predetermined magnitude, and second counting means connected to said peak detecting means, said second counting means providing an indication of the number of times the second output voltage exceeds the predetermined magnitude for a predetermined length of time.

9. The current monitor of claim 8 wherein the magnetic diodes are serially connected to a constant current source, s first of said diodes being positioned in the magnetic field of the monitored current to provide a decrease in its forward conduction resistance with an increase in the magnetic field, and a second of said diodes being positioned in the magnetic field of the monitored current to provide an increase in its forward conduction resistance with an increase in the magnetic field.

10. The current monitor of claim 8 wherein the peak detecting means comprises energy storing means, said energy storing means maintaining a second output voltage thereon having a magnitude which is substantially equal to the peak of the first output voltage.

11. The current monitor of claim 8 wherein the first coupling means comprises an electromechanical indicating means which provides an additional indication each time the electromechanical indicating means is energized, said electromechanical indicating means being energized by first switching means, the second output voltage being applied to said first switching means, and said first switching means conducting when the second output voltage exceeds the predetermined magnitude.

12. The current monitor of claim 8 wherein the second counting means comprises an electromechanical indicating means which provides an additional indication each time the electromechanical indicating means is energized, said electromechanical indicating means being energized by second switching means, the second output voltage being applied to said second switching means, and said second switching means conducting when the second output voltage exceeds the predetermined magnitude for the predetermined length of time.

13. The current monitor of claim 12 wherein the second switching means comprises energy storing means which is electrically connected to the second output voltage through an impedance means, said energy storing means developing a third voltage thereon when the second output voltage exceeds the predetermined magnitude for the predetermined length and time, said third voltage being applied to a solid state circuit element, said circuit element conducting when the third voltage is applied thereto.

* * * * *